United States Patent [19]

Seymour et al.

[11] Patent Number: 5,774,320
[45] Date of Patent: Jun. 30, 1998

[54] MODULAR CURRENT TRANSFORMER FOR ELECTRONIC CIRCUIT INTERRUPTERS

[75] Inventors: Raymond K. Seymour, Plainville, Conn.; Ertugrul Berkcan, Niskayuna, N.Y.

[73] Assignee: General Electric Company, New York, N.Y.

[21] Appl. No.: 736,090

[22] Filed: Oct. 24, 1996

[51] Int. Cl.$^6$ .................................................. H02H 3/00
[52] U.S. Cl. .......................... 361/93; 361/115; 336/131; 336/196; 336/221
[58] Field of Search ................................ 361/93, 99, 102, 361/115, 94–98; 336/131, 196, 221

[56] References Cited

U.S. PATENT DOCUMENTS

| | | | |
|---|---|---|---|
| 3,846,675 | 11/1974 | Shimp | 361/95 |
| 4,297,741 | 10/1981 | Howell | 361/93 |
| 4,591,942 | 5/1986 | Willard et al. | 361/97 |
| 4,672,501 | 6/1987 | Bilac et al. | 361/96 |
| 4,734,975 | 4/1988 | Ballard et al. | 29/606 |
| 4,796,148 | 1/1989 | Ruta | 361/97 |
| 4,937,757 | 6/1990 | Dougherty | 364/492 |
| 5,204,798 | 4/1993 | Scott | 361/93 |
| 5,302,786 | 4/1994 | Rosen et al. | 200/400 |
| 5,321,378 | 6/1994 | Ferullo et al. | 335/202 |
| 5,359,314 | 10/1994 | McQuay et al. | 336/192 |
| 5,583,732 | 12/1996 | Seymour et al. | 361/93 |

OTHER PUBLICATIONS

U.S. application No. 08/358,493, Seymour et al., filed Dec. 19, 1994.

*Primary Examiner*—Jeffrey A. Gaffin
*Assistant Examiner*—Michael J. Sherry
*Attorney, Agent, or Firm*—Richard A. Menelly; Carl B. Horton

[57] ABSTRACT

A modular current transformer containing both air and metal cores on a common load strap provides sensing current to the electronic trip unit within the circuit interrupter along with supplying operating power to the trip unit components. The current sensing coil is arranged concentricity within the transformer core while the power generating coil is arranged concentricity outside the core.

12 Claims, 3 Drawing Sheets

MODULAR CURRENT TRANSFORMER FOR ELECTRONIC CIRCUIT INTERRUPTERS

BACKGROUND OF THE INVENTION

The advent of digital circuit implementation to the electrical distribution and control field has resulted in combining several electronic functions within a single modular enclosure. One example of a circuit interrupter having supplemental protective relay function is found in U.S. Pat. No. 4,672,501 entitled "Circuit Breaker and Protective Relay Unit".

To provide a continuous sample of the current level within an associated electrical distribution system, a current transformer is connected within the circuit interrupter, as described within U.S. Pat. Nos. 4,591,942 and 5,321,378 both entitled "Current Transformer Assembly". The current transformers as employed therein also derive operating power from the circuit current to power-up the electronic components within the circuit interrupter electronic trip unit. It has been found advantageous to use a single iron core current transformer to both sense the circuit current along with providing operational power to the electronic trip unit in higher ampere-rated circuit interrupters. To prevent the iron cores from becoming saturated at higher current levels, expensive magnetic steel laminates are used and the laminates are sized to allow short circuit current sensing without causing the cores to saturate.

U.S. Pat. No. 4,796,148 entitled "Current-Sensing Arrangement Utilizing Two Current-Sensing Signals" teaches the use of a separate air core transformer and a separate iron core transformer to increase the current sensing range when the iron core saturates.

U.S. Pat. No. 4,297,741 entitled "Rate Sensing Instantaneous Trip Mode Network" describes the use of an iron core transformer for sensing ordinary current overload levels along with a separate air core transformer to sense short circuit currents.

U.S. Pat. No. 3,846,675 entitled "Molded Case Circuit Breakers Utilizing Saturating Current Transformers" teaches the use of iron core transformers for providing operating power to the trip unit and separate air core transformers for monitoring the circuit current.

In lower ampere-rated electronic circuit interrupters, the current transformer size constraints require the use of expensive core steel laminations to optimize transformer action with the least possible amount of material without reaching saturation when such current transformers are used for both sensing circuit current as well as powering up the electronic trip unit circuit. It would be economically desirable to perform such sensing and power-up functions by use of a single nodular transformer design for all the reasons given earlier. One such modular design is described within U.S. Pat. No. 5,583,732 entitled "Modular Current Transformer for Electronic Circuit Interrupters" wherein separate iron core and air core transformers are used to sense circuit current within a protected circuit while providing operating power to the circuit interrupter electronic trip unit. U.S. patent application Ser. No. 08/735719 entitled "Self Powered Axial Current Sensor With Rectangular Geometry" filed on 23 Oct. 1996 describes a compact current transformer arrangement wherein the current sensor coil is arranged within the transformer core and the power generating coil is arranged outside the transformer core. The advent of such compact and inexpensive current transformers now allows the use of circuit interrupters within lower ampere commercial and industrial environments.

One purpose of the invention is to provide a compact circuit interrupter employing an electronic trip unit whereby the operating power to the trip unit is provided by means of an iron core and the current sensing is provided by means of an air core both within a compact common modular assembly.

SUMMARY OF THE INVENTION

A circuit interrupter employing an electronic trip unit utilizes a modular current transformer containing both air and metal cores on a common load strap for providing sensing current to the electronic trip unit within the circuit interrupter along with supplying operating power to the trip unit electronic components. The current transformer sensor coil is arranged within the transformer core and the power generating coil is arranged outside the transformer core on a common axis.

DESCRIPTION OF THE PREFERRED EMBODIMENT

Figure 1:
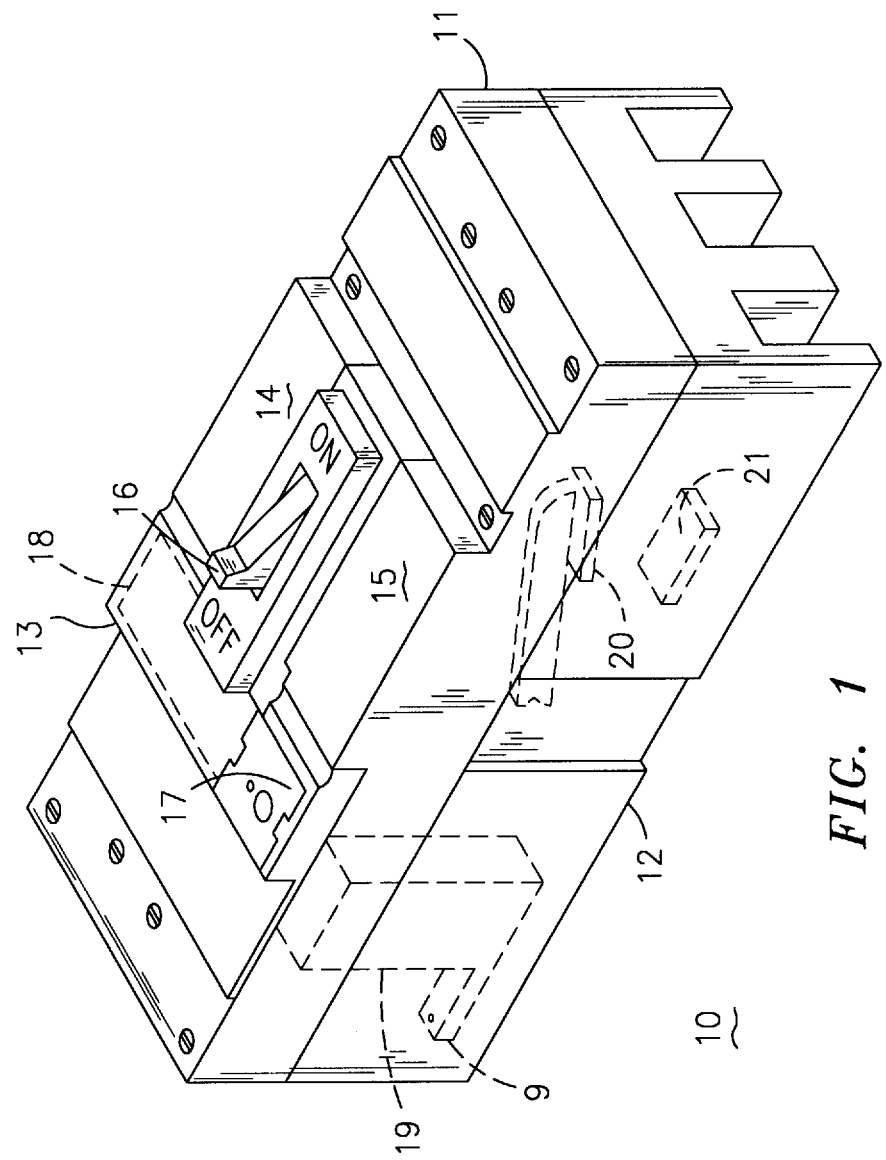
FIG. 1 is a top perspective view of a lower ampere-rated circuit interrupter containing the modular current transformer according to the invention.
Figure 2:
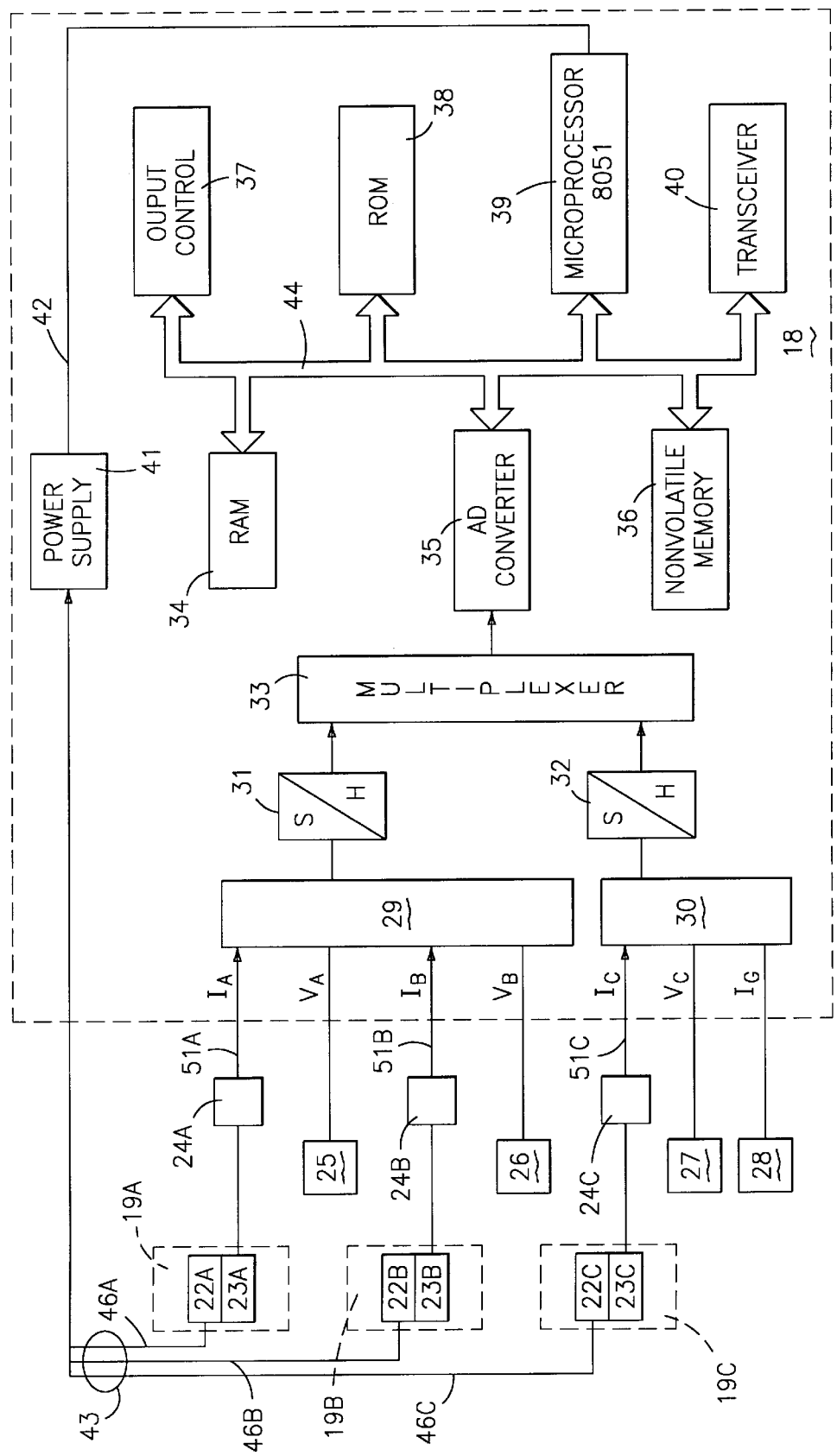
FIG. 2 is a diagrammatic representation of the circuit components used with the electronic trip unit within the circuit interrupter of FIG. 1.

A circuit interrupter 10 of the type consisting of a molded plastic cover 11 secured to a molded plastic case 12 is shown in FIG. 1. The provision of an accessory cover 13 and accessory doors 14, 15 allows field as well as factory installed electric accessories such as described in U.S. Pat. No. 5,302,786 entitled "Circuit Interrupter With Remote Control". An externally-accessible operating handle 16 controls the open and closed conditions of the movable contact 20, and fixed contact 21 located within the case to allow and interrupt current flow through an associate electrical distribution circuit. Automatic circuit protection against overload circuit conditions is provided by means of an electronic trip unit 18 located within the circuit interrupter cover, such as described within U.S. Pat. No. 4,937,757 entitled "Digital Circuit Interrupter with Selectable Trip Parameters". A rating plug 17 allows the circuit interruption rating to be set by externally accessing the electronic trip unit as described within U.S. Pat. No. 5,204,798 entitled "Metering Accessory for Molded Case Circuit Breakers". Connection with an external electrical distribution circuit is made by means of the load strap 9 that extends within the modular current transformer 19 which will be described below in greater detail. The operation of the trip unit 18 is best seen by now referring to FIG. 2.

Three such modular current transformers 19A–19C, one for each phase of a multi-phase electrical distribution system, are used to provide both operating power as well as current sampling to the electronic trip unit 18. The so-called "power windings" 22A–22C connect with the power supply 41 by means of a multi-conductor cable 43 and conductor pairs 46A–46C to provide operating power to the trip unit 18 and power-up the microprocessor 39 over conductor 42. Current sensing of the associated electrical distribution circuit is made by means of the so-called "sensor windings" 23A–23C that provide three phase sample signals connected to integrators 24A–24C to provide current signals IA, IB, IC through conductor pairs 51A–51C to multiplexers 29, 30 and sample and hold amplifiers 31, 32 to the multiplexer 33. At the same time, sample voltages VA, VB, VC are provided by means of the voltage transformers 25–27 and ground fault samples IG are provided by means of the ground fault current transformer 28. The sample current and voltage data is inputted to a databus 44 through the A/D converter 35. The data is processed within the microprocessor 39 under operating instructions contained within the ROM 38 and stored reference values contained within the RAM 34 and NVM 36. Control signals are outputted via the output control circuit 37 to interrupt the circuit current when the overcurrent condition exists for longer than a prescribed time increment. Information to related circuit interrupters and accessory electrical devices is transmitted by means of the transceiver 40.

Figure 3:
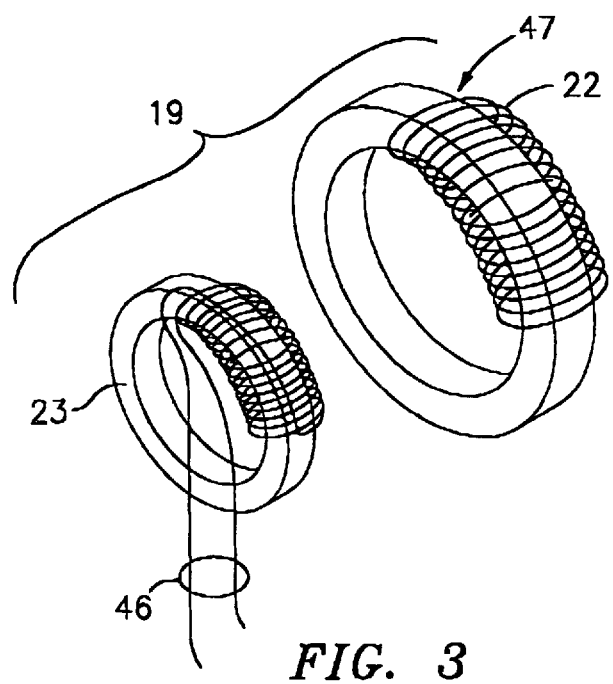
FIG. 3 is an enlarged front perspective view of the components of the modular current transformer within the circuit interrupter of FIG. 1.

In further accordance with the invention, the modular current transformer 19, similar to the self-powered axial current sensor described within aforementioned U.S. patent application Ser. No. 08/735,719, has the configuration depicted in FIGS. 3 and 4. The sensor winding 23 terminating in the conductor pair 46 is inserted within an iron core 47. The power winding 22 terminating in the conductor pair 51 is next arranged over the core to complete the current transformer. The sensor winding 23 serves as an air core transformer which has a greater sensitivity to differential current changes within the protected circuit and does not exhibit saturation limitation effects that would occur at higher currents when iron cores are used. The power winding 22 now serves as an iron core transformer which requires less iron with partial saturation of the core to provide sufficient operating power to the trip unit 18 of FIGS. 1 and 2, and hence can be made more compact since substantially less iron is required to produce power. The core could comprise amorphous steel in the form of a pair of C-shaped sections, if desired.

Figure 4:
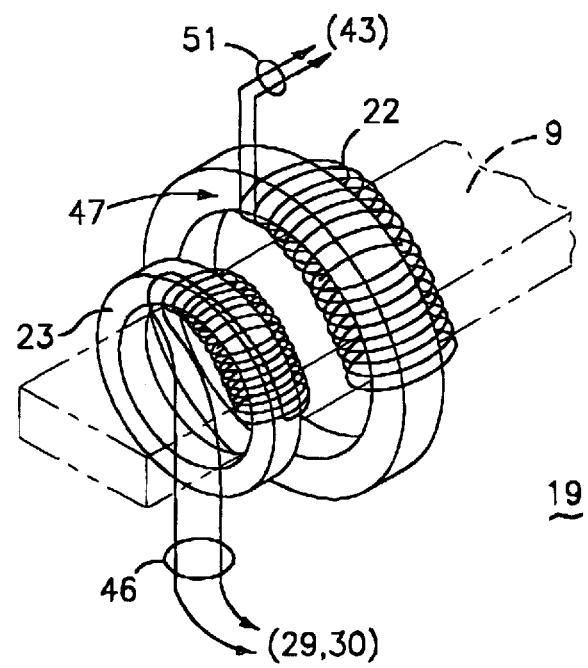
FIG. 4 is an enlarged front perspective view of the modular current transformer of FIG. 2 relative to the circuit breaker load strap.

The compact arrangement of the modular current transformer 19 relative to the rectangular load strap 9 is shown in FIG. 4 with the load strap depicted in phantom and with the sensor winding 23, iron core 47 and power winding 22 concentrically arranged with the load strap. The positioning of the sensing winding directly adjacent to the load strap promotes sensitive response to the electromagnetic field variations indicative of the current transfer through the load strap and is an important feature of the invention. As described earlier, with reference to FIG. 2, electrical connection with the power supply 41 is made by means of the conductor pair 51 and the multi-conductor cable 43, while electrical connection with the multiplexers 29, 30 is made is made by means of the conductor pairs 46.

As described in the aforementioned U.S. Pat. No. 5,583, 732, the small size requirements with the iron core transformers allows the use of so-called "amorphous" metal within the iron core with low power loss and rapid transformer action. Such amorphous core transformers are described within U.S. Pat. Nos. 4,734,975 entitled "Amorphous Core Laminations" and 5,359,314 entitled "Core and Coil Assembly for an Amorphous Steel Core Electric Transformer".

A modular transformer having the capability of providing rapid power-up to the electrical components within and electronic trip unit along with extended current sensing without saturation has herein been described. The modular transformer having the dual functions allows the use of electronic trip units within lower ampere-rated circuit interrupters used within industrial facilities.

We claim:

1. A circuit breaker comprising:
   a plastic case and a plastic cover;
   a pair of separable contacts within said case and arranged for separation upon occurrence of an overcurrent condition in a protected electrical circuit;
   an electronic trip unit in said cover controlling said separable contacts and determining said overcurrent condition; and
   a modular transformer within said case electrically connected with said trip unit and electro-magnetically coupled with a metal strap, said transformer comprising a first winding concentricallyy arranged about said strap for providing sample current flow to said trip unit, a metal core concentrically arranged about said first winding, and a second winding concentrically arranged about said core for providing electric power to said trip unit.

2. The circuit breaker of claim 1 wherein said trip unit includes a multiplexer and said first winding connects with said multiplexer.

3. The circuit breaker of claim 2 wherein said trip unit includes a power supply and said second winding connects with said power supply.

4. The circuit breaker of claim 1 wherein said core comprises iron.

5. The circuit breaker of claim 1 wherein said core comprises amorphous steel.

6. The circuit breaker of claim 1 wherein said core comprises a pair of C-shaped sections.

7. The circuit breaker of claim 1 wherein said first winding comprises an air core transformer.

8. The circuit breaker of claim 1 wherein said second winding and said metal core comprise an iron core transformer.

9. The circuit breaker of claim 3 wherein said trip unit further includes a microprocessor for rendering said overcurrent determination, said power supply being connected to said microprocessor to power-up said microprocessor.

10. The circuit breaker of claim 9 wherein said multiplexer connects with said microprocessor through a databus.

11. An electronic trip unit for electric circuit interrupters comprising in combination:
    a modular current containing a first winding electro-magnetically coupled to a metal strap by means of an air gap to provide sampling current derived from current transfer through said metal strap;
    a metal core arranged over said first winding and said metal strap for electro-magnetically coupling with said metal strap;
    a second winding arranged over said first winding and said core for electro-magnetically coupling with said core to provide operating current derived from said metal strap;
    a power supply connected with a microprocessor for providing operating power to said microprocessor, said microprocessor being arranged for determining overcurrent conditions within a protected electrical circuit;
    whereby said first winding electrically connects with said microprocessor for providing sensing current to said microprocessor from said electrical circuit and said second winding electrically connects with said power supply for providing operating power to said power supply from said electrical circuit.

12. The electronic trip unit of claim 11 wherein said metal core comprises amorphous metal.

* * * * *